United States Patent [19]

Lundquist

[11] Patent Number: 4,584,755
[45] Date of Patent: Apr. 29, 1986

[54] METHOD OF PLUGGING A HOLE IN AN OBJECT

[76] Inventor: Lynn Lundquist, 10833 NE. Russell St., Portland, Oreg. 97220

[21] Appl. No.: 549,294

[22] Filed: Nov. 7, 1983

[51] Int. Cl.$^4$ ............................................. B23P 11/02
[52] U.S. Cl. ........................................ 29/451; 29/235; 138/89
[58] Field of Search ............... 29/451, 235, 522 R, 29/523; 138/89, 97; 411/15

[56] References Cited

U.S. PATENT DOCUMENTS

| 3,156,373 | 11/1964 | Willis | 138/89 X |
| 3,525,365 | 8/1970 | Meulendyk et al. | 138/89 |
| 3,692,059 | 9/1972 | Ice, Jr. | 138/89 |
| 3,929,250 | 12/1975 | Abbate | 138/89 X |
| 4,091,841 | 5/1978 | Beneker et al. | 138/97 X |

FOREIGN PATENT DOCUMENTS

| 1955005 | 10/1969 | Fed. Rep. of Germany | 138/89 |
| 956971 | 8/1949 | France | 138/89 |

*Primary Examiner*—Charlie T. Moon
*Attorney, Agent, or Firm*—Glen A. Collett

[57] ABSTRACT

An apparatus and method of sealing or plugging a hole in an object, such as a coolant passage in an injection molding die. The plug includes a flexible, hollow cylindrical sleeve and a core member longitudinally interengageable into the sleeve. The core member is slightly larger than the bore of the sleeve and when drawn into the sleeve expands it to fill the hole and secure the plug. The plug may be used either internally as a diverting plug or externally as a sealing plug. The inserting tool is designed to position the plug in the hole as desired, and to interengage the core member into the sleeve. The plug is inserted into the hole with the sleeve and core member separate. Then the sleeve is supported in position and the core is interengaged into the sleeve.

6 Claims, 6 Drawing Figures

னு4,584,755

METHOD OF PLUGGING A HOLE IN AN OBJECT

BACKGROUND OF THE INVENTION

This invention relates to plugging a hole in an object, and particularly to a plug, inserting tool and the method for plugging an unused coolant passage or the like in an injection molding die.

In almost all cases where a product is manufactured by forming it in a die or mold, the die body will incorporate drilled passages for a liquid cooling or heating medium. This is true in injection plastic molding, injection rubber molding and metal die casting. In thermoform and die casting processes, the die is cooled by a liquid medium, usually water, in the drilled passages. In thermoset processes, the die is heated by hot oil or steam circulated through the drilled passages.

With only the exception of a drilled passage with an inlet and outlet on its two openings, all interconnecting drilled passages must have some provision for plugging unused openings to prevent external leaking. Further, when a labyrinth pattern is formed in the die body by intersecting a passage with three or more perpendicular passages, soxe form of diverting plug is used to cause the liquid to flow in the prescribed flow path.

General prior practice among tool and die makers is to seal an unused external opening with a threaded pipe plug. This is a secure and effective solution, although it requires machine time to form the threads.

An alternative to the pipe plug is a threadless pressure plug, which has a screw that squeezes and expands an O-ring. This approach has the advantage of eliminating the time necessary to machine threads. However, the expansion plug is considerably more expensive than a pipe plug.

In those cases where internal passages are plugged to divert the liquid flow, there are a number of prior products or techniques used in the tool and die trade to seal the unused passages. The threadless expansion plug is often used, although it is complicated to position and tighten. In a blind hole, that is, where there is access only from one end, the die maker must be careful not to press it further into the hole beyond the position where it is desired.

More commonly used are plug-and-spacer arrangements wherein a slip-fit plug blocks the drilled passage and is positioned by small diameter rods. In some applications, the tool and die shop may manufacture its own spool shaft by reducing the diameter of a slip-fit rod in those areas where flow is desired. Each of the present designs has inherent limitations. In the case of plug-and-spacer arrangements, the seal around the plug is never complete. Because the drilled passage is rough, clearance is required to push the plug to the required depth. The resulting leakage past the plug area may be sufficient to alter the liquid flow, especially when the flow is restricted at the manifold valves to control die temperature. Further, the small diameter rods used in the flow area can accrete liquidborne contaminants causing an eventual accummulation which can restrict or plug the entire passage system. The time required to manufacture and fit a plug-and-spacer diverting system is also a factor to be considered, especially when machining is required.

Accordingly, it is the general object of the present invention to provide a plug for sealing a hole in an object, particularly a coolant passage in an injection molding die, a tool for inserting the plug, and a method of so doing.

A further object is to provide such a plug which is easily and accurately positionable in a blind hole.

Yet another object is to provide a plug which can be speedily installed.

Another object is to provide a plug which is very simple to manufacture at low cost.

A further object is to provide an inserting tool for the plug which is able to be operated from only one end of a hole.

Still another object is to provide such a tool which accurately places the plug at the desired location in the hole.

A still further object is to provide a method or system of installing the plugs of the present invention.

These and other objects and advantages of the present invention and the manner in which they are achieved will be made apparent as the specification and claims proceed, taken in conjunction with the drawings which illustrate the preferred embodiment.

SUMMARY OF THE INVENTION

In its basic form, the invention is a plug for sealing a hole in an object such as an injection molding die, a tool for installing the plug, and a method of so doing. The plug includes a flexible sleeve, generally of a hollow cylindrical configuration, having a longitudinal bore therethrough leaving a substantially uniform sleeve wall, and having an outside radial dimension slightly smaller than the hole when the plug is in its unassembled condition, and being expansable to an outside radial dimension which fills the hole when the plug is assembled, and an impervious core member, generally of a cylindrical configuration, and dimensioned slightly larger in radial dimension than the bore of the unassembled sleeve, the core member being operable to longitudinally interengage and radially expand the sleeve into sealing engagement with the hole wall upon assembly. The inserting tool is designed to position and interengage the plug at a location in the hole as desired.

DESCRIPTION OF THE PREFERRED EMBODIMENT

Figure 6:
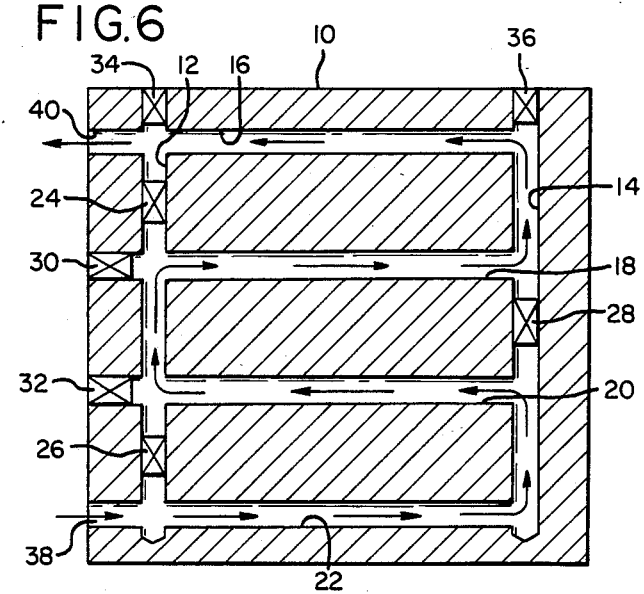
FIG. 6 is a schematic section showing the plan for installing the plug of the present invention in a labyrinth pattern of drilled passages in an injection molding die.

FIG. 6 illustrates a mold base, shown generally at 10, in which a section is taken on a labyrinth pattern of cooling passages. Holes 12 and 14 are drilled vertically into the mold base. Interconnecting horizontal holes 16, 18, 20 and 22 are drilled to intersect vertical holes 12 and 14. None of the holes need to be drilled completely through the mold base.

The pattern for plugging the interconnecting passages is illustrated schematically in FIG. 6. Both internal plugs 24, 26 and 28 and external plugs 30, 32, 34 and 36 are required. The appropriate plugs in the positions shown direct the coolant through the passages in the mold base as shown by the arrows.

Appropriate connections are made to the inlet 38 and the outlet 40 for supplying coolant to the mold base.

While the above description is directed to a plastic injection die, it must be realized that a similar configuration is also applicable in metal die casting which also uses coolant, and thermoset injection molding in which a heating medium is passed through the passages. It should also be understood that while the present invention has particular utility to plugging passages in a molding die, it may also be used to plug a hole, under similar circumstances, in any other object.

Figure 1:
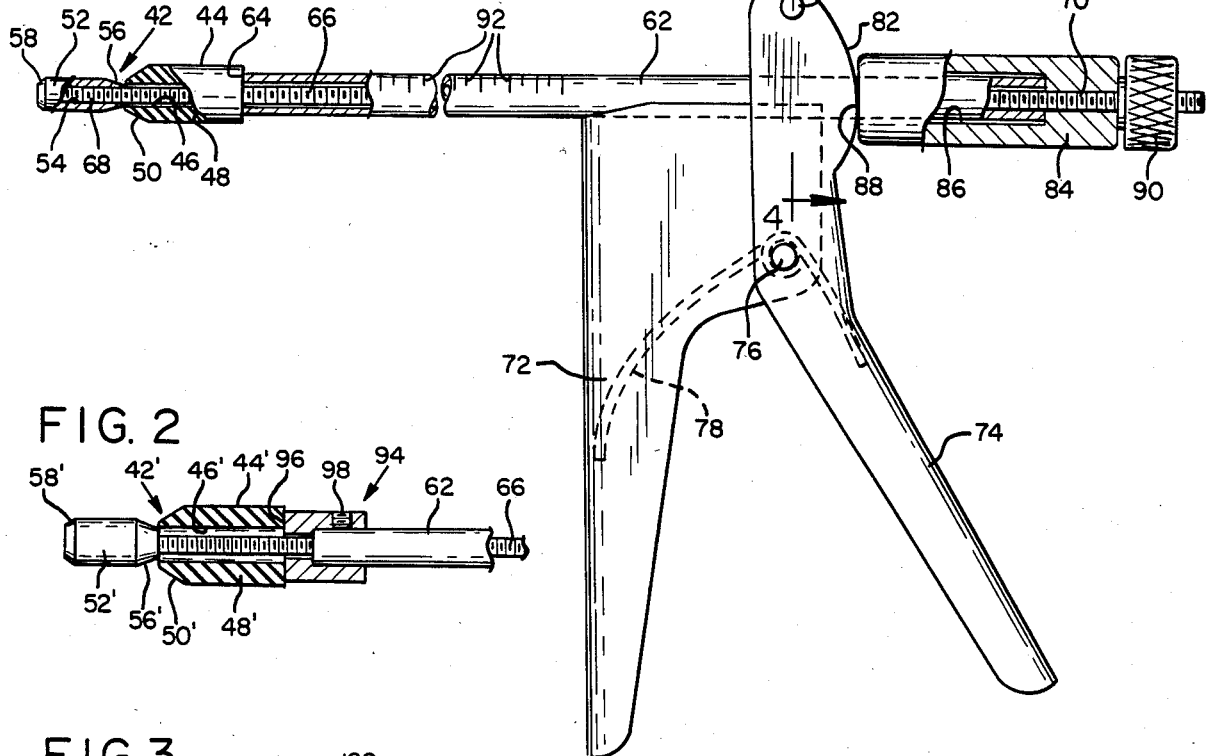
FIG. 1 is a fragmentary side view of the inserting tool, with an unassembled plug mounted thereon ready for insertion according to the present invention.
Figure 2:
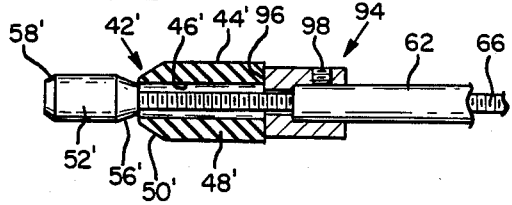
FIG. 2 is a fragmentary view of the end of the inserting tool and the plug, similar to FIG. 1, additionally illustrating the use of a sleeve adapter.
Figure 3:
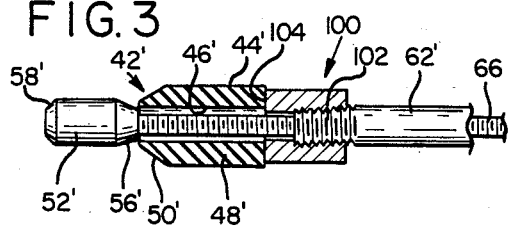
FIG. 3 is a fragmentary view similar to FIG. 2, illustrating a second embodiment of the sleeve adapter.
Figure 5:
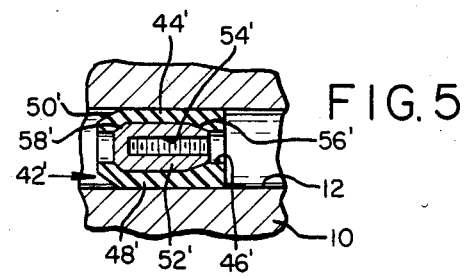
FIG. 5 is a section of the assembled plug, shown fully assembled in a fragmentary portion of an object.

The plug of the present invention is illustrated in FIG. 1 generally at 42, and in FIGS. 2, 3 and 5, shown in larger version, generally at 42'.

The plug has two parts, the first of which is a flexible sleeve 44. The sleeve is preferably of an elastometric material. It is preferably coated with a suitable rubber lubricant (not shown) to facilitate assembly of the plug. The sleeve is of a hollow cylindrical configuration, having a longitudinal bore 46 therethrough. This leaves a substantially uniform sleeve wall 48. When the plug is in its unassembled condition, the outside radial dimension is slightly smaller than the hole which it is to plug. However, it is expansible to an outside radial dimension which fills the hole when the plug is assembled. The leading end of the sleeve, the end first inserted into the hole, is tapered on the outside surface thereof at 50 to facilitate the insertion of the sleeve into the hole.

The other part of the plug is a core member, shown generally at 52. The core is impervious and is preferably made of brass or similar material. It is generally of a cylindrical configuration, and is dimensioned slightly larger in radial dimension than the bore 46 of the unassembled sleeve 44. The core member is operable to longitudinally interengage the sleeve by being pulled into the bore. This radially expands the sleeve into sealing engagement with the wall of the hole into which it is inserted. The core member includes engagement means for releasably attaching a pulling means thereto to draw the core into the sleeve. For this purpose, the core preferably includes a threaded blind hole 54 in its end which is engageable with a threaded pulling rod. The leading end of the core member, the end first engaging the sleeve, is tapered on the outside surface thereof at 56 to facilitate interengagement with the sleeve. The trailing edges of the core member are also preferably tapered or beveled at 58.

A plug similar to that shown at 42 in FIG. 1, but larger in radial dimension, is illustrated in FIGS. 2, 3 and 5. The plug is shown generally at 42' and analogous features to those of the plug of FIG. 1 are also denoted by primed reference numerals.

FIG. 5 shows the plug 42' in assembled condition in a hole in an object such as hole 12 in mold base 10. Core member 52' has been drawn into sleeve 44'. This radially expanded the sleeve and caused it to be pressed into intimate contact with the hole wall. The elastomer sleeve constricts over the ends of the core member since the core member is shorter than the sleeve and is beveled on both ends, at 56' and 58'. This arrangement, with the core member longitudinally positioned within the sleeve, securely anchors the plug from pressure-induced movement. However, the bevel aids plug removal in those rare cases when it is necessary to drive or drill out the plug.

Figure 4:
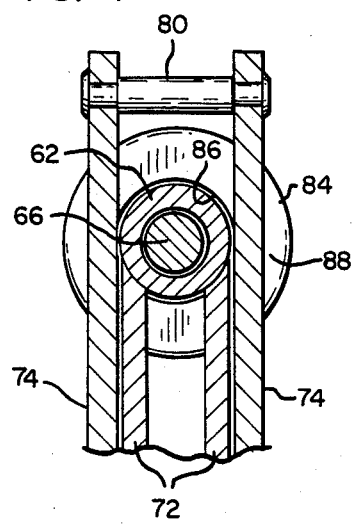
FIG. 4 is a fragmentary section taken along the line 4—4 of FIG. 1.

Now referring to FIGS. 1 and 4, a tool is disclosed for inserting the previously described plug into a hole in an object and seating the plug at a particular location in the hole. The tool is shown generally at 60, and includes an elongated, substantially straight tube 62. The tube is of a diameter smaller than the hole, and may be as long as desired, as noted by the fragmentary break in FIG. 1. At the forward end of the tube, an abutment surface 64 is provided for supporting the rear end of sleeve 44.

A rod 66 extends longitudinally through the tube. Its forward and rearward ends are threaded, and for convenience of manufacture, may be threaded its entire length. The forward threaded end is denoted at 68 and engages the threaded hole 54 in core 52. The threaded rearward end of the rod is denoted at 70.

A squeeze handle is mounted on tube 62 and includes a stationary front handle 72 secured to the tube. A movable rear handle 74 is pivoted to the front handle at pivot 76. A spring 78 biases the handles outwardly. As best shown in FIG. 4, a rivet and spacer 80 provides rigidity for the split top portion of handle 74. The movable handle includes a rearwardly facing cam surface 82 which, when it is rotated about pivot 76 upon squeezing the handle, presents a smooth rearward motion along the longitudinal direction of tube 62.

An adjusting cylinder 84 is screwed onto the threaded rear end 70 of rod 66. The adjusting cylinder includes a guide surface 86 which overlaps the rear end of tube 62. It may be rotated to allow more or less of the rod to extend through the tube. The forward end of the adjusting cylinder includes a cam bearing surface 88 which abuts the cam surface 82 of handle 74.

A lock nut 90 is screwed onto the threaded rearward end 70 of rod 66 and abuts the adjusting cylinder to lock the assembly on the threaded rod. The outside surface of the lock nut may be knurled as may the outside surface of the adjusting cylinder.

Preferably, tube 62 includes markings or measuring indicia, illustrated at 92, for determining the extension of the tube into the hole. These may be standard inch markings or may be any other measurment system as desired.

FIG. 2 illustrates a sleeve adapter, shown generally at 94, which is releasably mounted on the end of tube 62. The sleeve adapter has a larger abutment surface 96 on its forward end than that of the tube. The larger abutment surface provides a more stable base for supporting the rear end of larger sleeve 44'. A set screw 98 locks the sleeve adapter on the end of the tube.

A second embodiment of the sleeve adapter is illustrated in FIG. 3, generally at 100. In this embodiment, the sleeve adapter is threaded to fit on the threaded end 102 of tube 62'. Again, the larger abutment surface 104 is provided for supporting the rear end of sleeve 44'.

OPERATION

The present invention provides a plug which may be used either internally in a hole in an object, or externally at the opening of the hole. It also provides a tool for installing the plug at the desired location in a hole.

In order to ready the assembly for installing a plug in a hole, the tool is initially adjusted by manipulating adjusting cylinder 84 and lock nut 90 on the threaded rearward end 70 of rod 66 so that the appropriate amount of the threaded forward end 68 of the rod extends from the end of tube 62.

According to the size of the hole, an appropriate sleeve adapter 94 or 100 is selected and is placed on the end of tube 62.

Sleeve 44 is then placed over the forward end of rod 66, and the rear end of the sleeve abuts the abutment surface 64 of tube 62. Core member 52 is then screwed onto the threaded forward end 68 of rod 66 and in this position assumes the configuration of FIG. 1.

The depth for the plug is measured, which is often done by using the tool itself, and the appropriate depth for insertion is noted on indicia 92.

The core member 52 and flexible sleeve 44 are then inserted into the hole up to the proper location according to indicia 92. The forward tapered end 50 of the sleeve aids the insertion into the hole.

As yet, the core member and flexible sleeve are separate, not having been interengaged.

The tapered leading end 56 of core member 52 is directed rearwardly, abutting the forward end of sleeve 44. Upon squeezing handles 72 and 74, cam surface 82 presses rearwardly on the cam bearing member 88 of adjusting cylinder 84. This draws rod 66 rearwardly in relation to tube 62. The tapered end of the core member enters the sleeve and the core is interengaged into the sleeve.

Because the outside dimension of core 52 is slightly larger than the bore 46 of plug 44, the interengagement radially expands the sleeve into sealing engagement with the hole wall. According to the adjustment of the adjusting cylinder 84, the draw of the core member into the sleeve is stopped while the core is positioned entirely inside of the sleeve. Even if the draw is longer than optimum, the front edge of the core abuts the forward surface 64 of tube 62 and will not pull further.

The squeezed handles 72 and 74 are then released and the solidified assembly of the adjusting cylinder 84, lock nut 90 and rod 66 is rotated to unscrew the threaded forward end 68 of the rod from the threaded hole 54 in the core member.

The tool is then withdrawn, leaving the assembled plug in the hole, similar to the plug shown in FIG. 5.

While the foregoing is the preferred method of using the apparatus of the present invention, it may be appreciated that various methods of assembly could be employed. However, it is contemplated that in most applications, the holes drilled into an injection molding die are accessable from only one end, and accordingly the method of assembly must work reliably from just one opening. In this regard, the core member is preferably inserted into the hole ahead of the sleeve and then drawn into the sleeve while the rear end of the sleeve is supported at the proper location in the hole. Obviously, however, various pulling means or pressing means may engage the plug directly or via some engagement means to effect the interengagement of the plug.

It can be seen that a very useful, simple and reliable apparatus and method for plugging a hole in an object is provided by the present invention. Only the preferred apparatus and method have been elaborated upon, and no limitation is intended thereby. Obvious modifications may be made by those skilled in the art without departing from the spirit and scope of the invention.

Having described my invention in its preferred embodiment, I claim:

1. A method of plugging a hole in an object comprising:
   (a) inserting into a hole a substantially cylindrical, flexible sleeve having an outside radial dimension slightly less than the dimension of the hole, and having a substantially cylindrical longitudinal bore therethrough;
   (b) inserting into the hole, separately from the sleeve, a substantially cylindrical core member having a radial dimension slightly larger than the bore of the sleeve;
   (c) locating the sleeve at the point in the hole where the plug is desired and supporting it at that location; and
   (d) longitudinally interengaging the core member into the sleeve which radially expands the sleeve into sealing engagement with the hole wall, the core member being located entirely within the sleeve and supported in a state of non-frictional stable equlibrium.

2. The method of claim 1 further comprising the step of lubricating the sleeve prior to interengaging the core member.

3. The method of claim 1 wherein the sleeve constricts over both ends of the core member.

4. A method of plugging a hole in an object comprising:
   (a) placing a substantially cylindrical, flexible sleeve having an outside radial dimension slightly less than the dimension of the hole and having a substantially cylindrical longitudinal bore therethrough over a rod;
   (b) releasably attaching to the end of the rod a substantially cylindrical core member having a radial dimension slightly larger than the bore of the sleeve;
   (c) inserting separately into the hole the core member and the sleeve;
   (d) supporting the sleeve in the hole at the location where the plug is desired;
   (e) longitudinally interengaging the core member into the sleeve by longitudinally pulling on the rod; and
   (f) detaching the rod from the core member and withdrawing the rod from the hole.

5. The method of claim 4 further comprising placing the rod in a tube, and using the tube to support the sleeve while the rod is pulled longitudinally through the tube.

6. A method of plugging a hole in an object comprising:
   (a) forming a substantially cylindrical, flexible sleeve having an outside dimension slightly less than the dimension of the hole, and having a substantailly cylindrical longitudinal bore therethrough;
   (b) forming a substantially cylindrical, impervious core member having a radial dimension slightly larger than the bore of the sleeve;
   (c) inserting separately into the hole the core member and the sleeve;
   (d) locating and supporting the sleeve at the point in the hole where the plug is desired; and
   (e) longitudinally interengaging the core member into the sleeve which radially expands the sleeve into sealing engagement with the hole wall.

* * * * *